A. MARSHALL.
COUPLING FOR PIPES AND CONDUITS.
APPLICATION FILED FEB. 28, 1919.

1,330,327.

Patented Feb. 10, 1920.

INVENTOR
ALEXANDER MARSHALL.
BY
William F. Hickel
ATTORNEY

UNITED STATES PATENT OFFICE.

ALEXANDER MARSHALL, OF CORONA, NEW YORK.

COUPLING FOR PIPES AND CONDUITS.

1,330,327.      Specification of Letters Patent.      Patented Feb. 10, 1920.

Application filed February 28, 1919. Serial No. 279,796.

*To all whom it may concern:*

Be it known that I, ALEXANDER MARSHALL, a citizen of the United States, residing in Corona, in the county of Queens and State of New York, have invented certain new and useful Improvements in Couplings for Pipes and Conduits, of which the following is a specification.

My invention relates to an improved coupling for pipes and conduits; particularly a coupling for pipes and conduits used in electrical wiring work to incase and protect electrical conductors.

An object of my invention is to provide a coupling which is simple in construction, and made up of few parts, capable of being easily assembled; and which will unite the ends of two lengths or sections of pipe, conduit or tubing in a manner that will afford a perfectly tight, leakproof joint, hold the ends of sections in rigid immovable relation to each other; and at the same time give a neat and finished appearance.

Other objects and advantages of my invention will appear from the following description, taken in connection with the accompanying drawings, which show the best embodiment of my invention now known to me. This disclosure, however, is explanatory only, and I may resort to changes as regards shape, size and arrangement of the various members illustrated, without departing from the scope and spirit of my invention as the appended claims define the same.

On the drawings.

The same numerals identify the same parts throughout.

My coupling embraces a member in the form of a bushing 1, adapted to engage a section of pipe or conduit; another member in the form of a bushing 2, adapted to receive a section of pipe or conduit; and a sleeve 3 to be screwed upon the bushings 1 and 2 and bind them together with one end of the bushing 1 abutting and making contact with one end of the second bushing and the end of the second section of pipe or conduit received in the latter.

Figure 1:
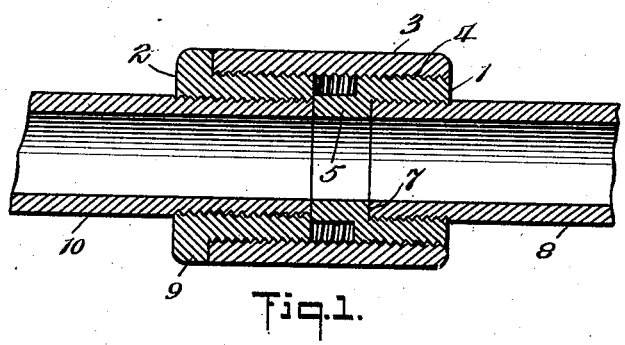
Figure 1 is a longitudinal section of a pipe coupling according to my invention.
Figure 2:
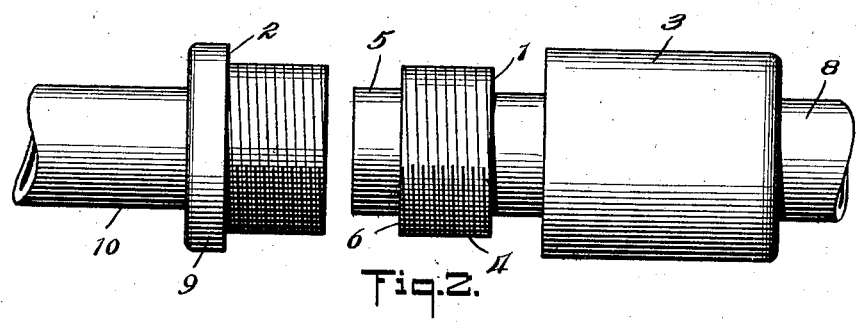
Fig. 2 is a side view of the various parts, showing how the coupling is applied.
Figure 3:
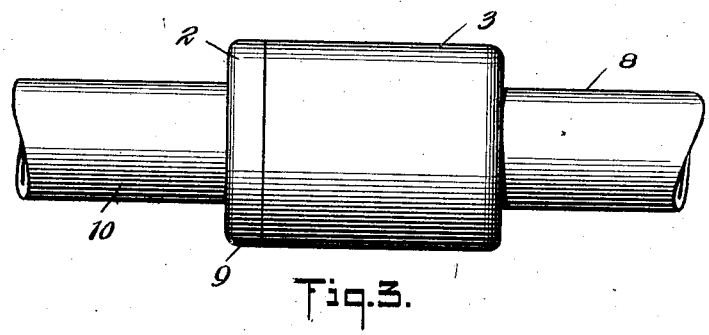
Fig. 3 is a side view showing a completed joint made by such a coupling.

The bushing 1 is externally threaded at 4 over the greater part of its length, and may have one end 5 without threads, and somewhat reduced, as shown in Figs. 1 and 2, to provide an external shoulder 6, if desired.

The other bushing 2 will have a bore therethrough, threaded throughout its length, and be provided at one end with an external flange 9. The outside of this bushing will also be threaded from the flange 9 to the opposite end of same. It is adapted to be screwed upon a second section of pipe or conduit 10, which will enter and engage the bore in the bushing 2 throughout the length of the latter, till the end of this section comes flush with the end of the bushing 2 opposite the flange 9 thereon.

To use the coupling, the sleeve which is internally threaded throughout, is first applied to the section 8 by slipping it over the end thereof; and then the bushing 1 is screwed upon the section 8 till this section engages firmly with the shoulder 7. Next the bushing 2 is screwed upon the section 10, till the end of the section 10 and the end of the bushing 2 opposite the flange 9 are flush, as above stated. These ends of the bushing 2 and section 10 are now held against the reduced end 5 of the bushing 1 and in alinement with same; and the sleeve 3 is turned back over the bushing 1 till it engages the bushing 2 and abuts the flange 9. Thus the bushing 1 is held firmly against the bushing 2 and end of the section 10. The coupling is then assembled and the joint finished.

Preferably the smaller portion of the bore through the bushing 1, will have the same diameter as the bores of the sections 8 and 10, but it may vary somewhat without creating difficulties. The sleeve will bind the two bushings and the two sections tightly together, holding the sections in rigid and immovable relation to each other, and a sealed joint is thus obtained.

The terminal edges of the flange and sleeve, opposite their meeting faces where they abut, will be smoothed off by rounding or beveling, and as the flange and the sleeve are of the same diameter, a finished effect is given.

The joint thus afforded is very neat and attractive; and the coupling can be applied or removed quickly and with very little effort. On account of the rigid connection of the sections 8 and 10 by the coupling, the latter can be utilized at any point, and joints can be made where supports for the pipes or conduits are not available. Hence an important advantage is secured and the utility of the coupling greatly increased, as supports for joints are not always at hand, under the varying conditions of actual practice; also the number of parts of the coupling is small and the cost of manufacture inconsiderable.

Having described my invention what I believe to be new and desire to secure and protect by Letters Patent of the United States is:—

1. A coupling for a pipe or conduit, embracing an externally threaded member having a bore therethrough with an enlarged portion to provide a shoulder in the member between the ends thereof, said enlarged portion being threaded, another member having a threaded bore and an external flange at one end and being threaded on its exterior between said flange and its opposite end, and a sleeve to unite said members, said sleeve abutting said flange.

2. A coupling for a pipe or conduit, embracing an externally threaded member having a bore therethrough, with an enlarged portion to provide a shoulder in the member between the ends thereof, said enlarged portion being threaded to receive the end of a section of pipe or conduit, said section abutting the shoulder, another member having a threaded bore therethrough, said other member having a flange at one end and being externally threaded between said flange and its opposite end, a second section of pipe or conduit adapted to engage the bore in said other member, and to terminate flush with said opposite end thereof, and a sleeve to engage said members, the sleeve abutting the flange and binding the first member against the second member and the section engaged by the latter, the terminal edges of the flange and of the sleeve remote from the abutting faces of same being smoothed.

3. A coupling for a pipe or conduit, embracing a sleeve having a threaded bore therethrough, such sleeve being adapted to be slipped over the end of a section of pipe or conduit, an externally threaded member having a bore therethrough with an enlarged portion to provide a shoulder inside of said member between the ends thereof, said enlarged portion being threaded to engage the end of said section after the sleeve is slipped thereupon, said section abutting said shoulder when said member and said section engage each other; a second member having a threaded bore therethrough and having an external flange at one end, said second member being externally threaded between the flange and the opposite end, said second member being adapted to be screwed upon the end of a second section of pipe or conduit, said second section engaging said second member over the entire length of the latter and terminating flush with said opposite end, whereby, when the opposite end of said section member and the end of the section engaged thereby are brought into alinement with the first member and the section carrying same, the sleeve can be moved into an engagement with the threads on the first member and turned up to engage the threads on the second member until said sleeve abuts said flange, whereby, the two members will be bound in rigid relation and an immovable joint provided between the two sections of pipe or conduit, the terminal edges of the flange and of the sleeve opposite the meeting faces of the same being smoothed off.

In witness whereof, I have signed my name to this specification this first day of Feby., 1919.

ALEXANDER MARSHALL.